Aug. 4, 1964 D. A. AARONSON 3,143,666

SYSTEM FOR MAINTAINING PREDETERMINED TIME RELATIONSHIP BETWEEN REFERENCE SIGNALS AND INFORMATION SIGNALS

Original Filed Dec. 14, 1959 3 Sheets-Sheet 1

INVENTOR
D. A. AARONSON
BY Lucian C. Canepa
ATTORNEY

INVENTOR
D. A. AARONSON
BY Lucian C. Canepa
ATTORNEY

Aug. 4, 1964 D. A. AARONSON 3,143,666
SYSTEM FOR MAINTAINING PREDETERMINED TIME RELATIONSHIP
BETWEEN REFERENCE SIGNALS AND INFORMATION SIGNALS
Original Filed Dec. 14, 1959 3 Sheets-Sheet 3

INVENTOR
D. A. AARONSON
BY Lucian C. Canepa
ATTORNEY

United States Patent Office 3,143,666

Patented Aug. 4, 1964

3,143,666

SYSTEM FOR MAINTAINING PREDETERMINED TIME RELATIONSHIP BETWEEN REFERENCE SIGNALS AND INFORMATION SIGNALS

David A. Aaronson, New Providence, N.J., assignor to Bell Telephone Laboratories, Incorporated, New York, N.Y., a corporation of New York Original application Dec. 14, 1959, Ser. No. 859,258, now Patent No. 3,072,804, dated Jan. 8, 1963. Divided and this application Apr. 27, 1962, Ser. No. 190,698

5 Claims. (Cl. 307—88.5)

This is a division of my application Serial No. 859,258, filed December 14, 1959, now Patent 3,072,804.

This invention relates to digital information processing systems, and more particularly to such systems for maintaining a predetermined time relationship between reference signals and information signals.

In digital information processing systems the problem of maintaining a predetermined time relationship between information-bearing signals and reference or clock signals is often a highly troublesome one upon whose successful solution depends the ability of the system to accurately transmit information between two spaced terminals.

Digital information signals which are transmitted from a terminal in a specified time relationship with the output signals of a master clock may in the course of being transmitted to a receiving terminal be either delayed or advanced with respect to the clock or timing signals. Such delay or advancement results in the information signals falling out of synchronism with the timing signals, and this may result in the information signals being selectively processed at the receiving terminal in a manner different from that intended, thereby resulting in the transmitted and received information not being accurate or faithful reproductions of each other.

An object of the present invention is the improvement of digital information processing systems.

More specifically, an object of this invention is the detection and correction of the deviation of test signals from a predetermined time relationship with respect to timing signals.

These and other objects of the present invention are realized in a specific illustrative embodiment thereof which includes a digital information source that periodically transmits to a receiving terminal a test pattern of digital signals. The time relationship between this pattern and digital timing signals derived from a master clock is checked by a pulse position detector which provides output signals indicative of the deviation, if any, of the relationship from the desired one. These output signals control the amount of delay included in a communication channel interconnecting the digital information source and a utilization circuit.

In accordance with the principles of this invention, a predetermined time relationship between digital clock signals and a test pattern of digital signals is periodically checked and, if necessary, re-established. Accordingly, digital information signals transmitted between a source and a utilization circuit during the time interval between spaced test patterns is much more likely to be accurately received and reproduced at the utilization circuit than if a periodic check and correction of the time relationship between the test pattern and the clock signals were not conducted.

The pulse position detector included in illustrative embodiments of the principles of this invention comprises, for example, two pnpn diode devices to one terminal of each of which are coupled the digital information signals that are transmitted to the utilization circuit in the receiving terminal. Also, first and second sets of clock signals derived from the master clock circuit are respectively coupled to the same terminals of the diode devices.

The characteristics of the pnpn diodes are chosen such that only the application thereto of signals in adjacent digit positions causes the diodes to supply corrective output signals which selectively vary the delay of the communication channel interconnecting the digital information source and the utilization circuit.

Normally, that is, when the time relationship between the test pattern signals and the first and second sets of clock signals is the predetermined one, none of the test pattern signals occurs at the pulse position detector adjacent in time to a clock signal and, accordingly, the pulse position detector does not provide corrective output pulses. When, however, the time relationship between the test pattern signals and the clock signals lags behind the predetermined relationship by one digit position, a first type of corrective output signal is provided by the detector. Similarly, when the time relationship between the test pattern and clock signals advances or steps ahead in time by one digit position with respect to the predetermined relationship, a second type of corrective output signal is provided by the pulse position detector. In turn, the first and second types of output signals result in the addition or removal, respectively, of delays from the information-carrying communication channel, thereby to re-establish the desired time relationship between the test pattern signals and the clock signals.

It is a feature of the present invention that a digital information processing system include a digital information source, a communication channel interconnecting the source and a utilization circuit, clock circuitry, adjustable delay circuitry connected in the channel, and a pulse position detector which responds to the deviation of digital source signals from a predetermined time relationship with respect to signals from the clock circuitry by providing output signals that selectively adjust the delay circuitry and thereby re-establish the predetermined relationship.

It is another feature of this invention that a digital information processing system include two pnpn diode devices, circuitry for coupling respective sets of clock signals to said devices, and circuitry for coupling periodically-occurring test pattern digital signals to each of said devices, the desired or normal time relationship between the digital signals and each of the sets of clock signals being such that signals are not coupled to a device in consecutive digit positions, and the characteristics of the devices being chosen such that, under normal conditions, no corrective output signals are supplied therefrom and such that, under conditions wherein the relationship deviates by one digit position from the desired one (thereby to apply signals to the devices in consecutive digit positions), corrective output signals are supplied therefrom.

A complete understanding of the present invention and of the above and other features and advantages thereof may be gained from a consideration of the following detailed description of an illustrative embodiment thereof presented hereinbelow in connection with the accompanying drawing, in which.

Figure 1:
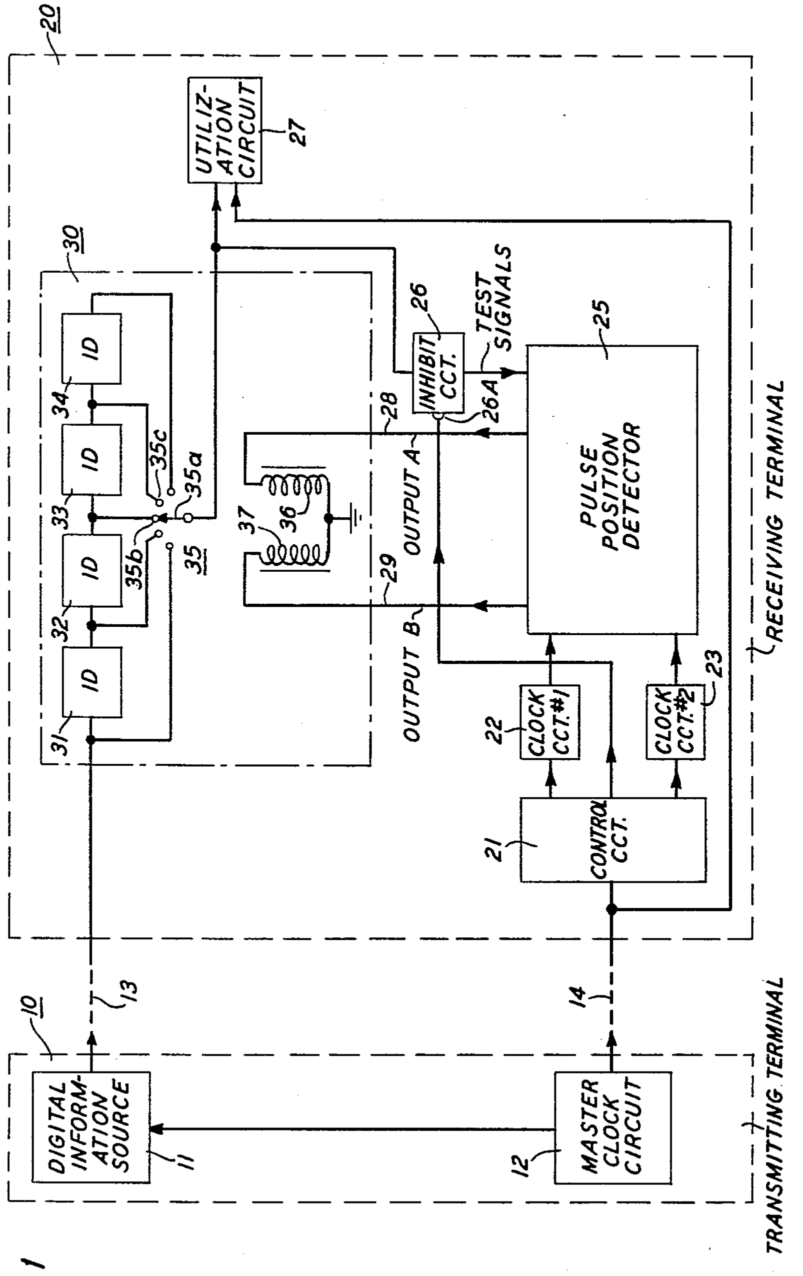
FIG. 1 is a block diagram of a digital information processing system illustratively embodying the principles of the present invention.

Looking at the system depicted in FIG. 1 from an over-all standpoint, there is shown a transmitting terminal 10 which includes a digital information source 11 and a master clock circuit 12. The system also comprises a receiving terminal 20 which includes a control circuit 21, a first clock circuit 22, a second clock circuit 23, a pulse position detector 25, an inhibit circuit 26, a utilization circuit 27, and an adjustable delay circuit 30.

The adjustable delay circuit 30 of FIG. 1 includes delay units 31, 32, 33, and 34 each of which introduces one digit period of delay to signals propagated therethrough. The circuit 30 also includes a switch assembly 35 and two windings 36 and 37 whose energization results in the selective actuation of the assembly 35, as described in detail hereinbelow.

The source 11 in the transmitting terminal 10 couples to a communication channel 13 digital information signals which are, in turn, routed to the utilization circuit 27. Also, the source 11, which is controlled by signals from the master clock circuit 12, periodically supplies to the channel 13 a fixed test pattern of digital signals. Thus, for example, following the transmission of ten words of variable information to the channel 13, the source 11 supplies thereto a fixed pattern of test signals, which pattern is followed in time by another ten words of information signals, which ten words are then followed by another test word, et cetera. Illustratively, each of the test words and variable information words may include twenty digit positions and, as specified in detail below in connection with the description of FIG. 3, each test word may include test signals only in digit positions 3, 10, and 17.

The periodic transmission of test words or fixed groups of digital signals to the channel 13 is directed to providing a basis for a periodic checking and correcting, if necessary, of the time relationship between digital source and clock signals. The importance of maintaining this relationship is evident from a consideration of the fact that the selective processing of received information signals in the utilization circuit 27 is also carried out under the control of signals from the master clock circuit 12. Thus, if transmitted information signals should deviate during transmission from the predetermined time relationship established in the transmitting terminal 10 with respect to the master clock signals, the information abstracted by the utilization circuit 27 from the information signals coupled thereto would not be an accurate representation of the information output of the source 11. Such deviation in time might, for example, result from transient electrical phenomena, aging of components, et cetera.

The master clock circuit 12, which, as specified above, controls the occurrence of output signals from the source 11, also couples clock signals along a channel 14 to the control circuit 21 and to the utilization circuit 27. The circuit 21, which includes frequency dividing and delay networks, selectively controls the operation of the first and second clock circuits 22 and 23 in a manner such that each of the circuits 22 and 23 couples a predetermined pattern of clock signals of the type specified below in connection with the description of FIG. 3 to the pulse position detector 25 during the word period in which test signals are supplied to the pulse position detector.

Test signals are applied to the pulse position detector 25 by means of an inhibit circuit 26. The circuit 26 functions to insure that variable information signals are not applied to the detector 25, thereby specifically guarding against the application to the detector 25 of any variable information signals which occur in adjacent digit positions. The inhibit circuit 26 includes an inhibiting signal input terminal 26A to which inhibiting signals are coupled from the control circuit 21. The control circuit 21 is arranged to provide inhibiting signals to the terminal 26A in all digit positions of the variable information words and to provide no inhibiting signals thereto in the digit positions of the test words.

It is noted that the transmitting terminal 10 may be connected to the receiving terminal 20 by means of the single transmission channel 13 shown in FIG. 1, thereby omitting the channel 14 between the master clock circuit 12 and the control circuit 21. In that case, both information and timing signals would be transmitted over the single channel 13 and suitable phase recovery and subsidiary clock circuits (not shown in FIG. 1) would be provided at the receiving terminal 20 to derive appropriate timing signals from the transmitted signals. Such timing signals would, in turn, be coupled to the input of the control circuit 21.

The pulse position detector 25 of the system shown in FIG. 1 provides no corrective signals on its output leads 28 and 29 so long as the desired time relationship between the output of the master clock circuit 12 and the test pattern output of the digital information source 11 is maintained, for the maintenance of this relationship results in test and clock signals arriving at the detector 25 in nonadjacent digit poistions. If, however, test signals should arrive at the pulse position detector 25 one digit position early with respect to their normal time relationship with the output signals of the circuits 22 and 23, an output is provided by the pulse position detector on the lead 28. This signal output A of the detector 25 energizes a winding 36 and causes a movable arm 35*a* of the switch assembly 35 to be moved in a clockwise direction from its normal position in contact with a tap 35*b* to a position in contact with a tap 35*c*, thereby adding one digit period of delay to the patch through which digital information signals are coupled to the pulse position detector 25 and the utilization circuit 27, thereby re-establishing the desired time relationship between the output of the source 11 and the output of the circuit 12.

On the other hand, if test signals should arrive at the pulse position detector 25 one digit position late with respect to the predetermined time relationship established with the output signals of the clock circuits 22 and 23, an output signal is provided by the detector on the lead 29. This signal output B energizes a winding 37 and causes the movable arm 35*a* of the switch assembly 35 to be moved in a counterclockwise direction, thereby removing one digit period of delay from the path traversed by digital information signals and re-establishing the predetermined time relationship.

Figure 2A:
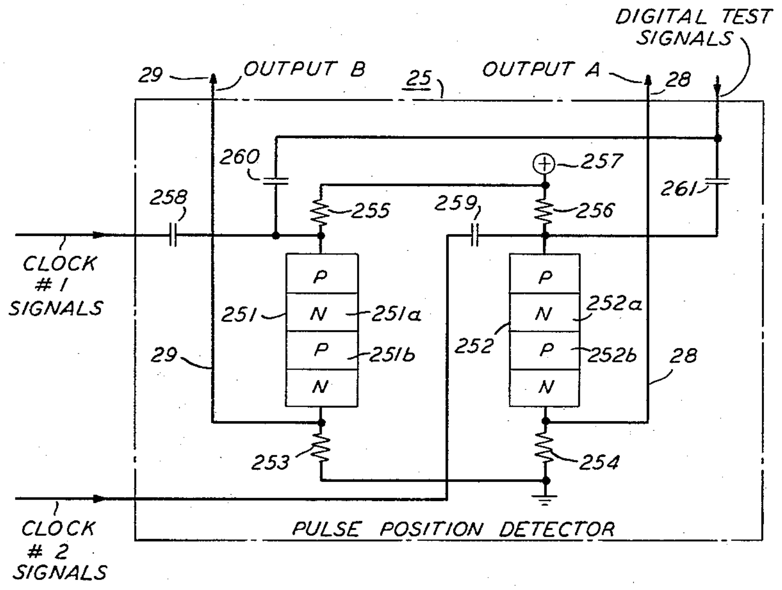
FIG. 2A is a circuit diagram of a specific illustrative pulse position detector of the type that may be included in the system shown in FIG. 1.

Referring to FIG. 2A, there is shown a circuit diagram of the pulse position detector 25. The detector comprises first and second pnpn diodes 251 and 252 of the type disclosed in W. Shockley Patent 2,855,524, issued October 7, 1958. The lower ends of the diodes 251 and 252 are respectively connected through load resistors 253 and 254 to ground, and the upper ends thereof are respectively connected through resistors 255 and 256 to a positive bias voltage source 257. Signals from the first clock circuit 22 are coupled through a capacitor 258 to the upper end of the diode 251 and signals from the second clock circuit 23 are coupled through a capacitor 259 to the upper end of the diode 252. Also, digital information signals are coupled through capacitors 260 and 261 to the upper ends of the diodes 251 and 252, respectively. Output signals from the diodes 252 and 251 appear on the leads 28 and 29 and are respectively designated A and B.

A brief review of some of the significant physical phenomena involved in the operation of a pnpn diode will be helpful in understanding the manner in which the pulse position detector 25 functions. A pnpn diode blocks appreciable current flow therethrough until the voltage thereacross exceeds a critical breakdown voltage. The impedance of such a diode in its nonconducting state is a function of the average density of minority charge carriers in the intermediate zones of the body of the diode. When a breakdown voltage is applied to the body, the average minority carrier density in the intermediate zones thereof, and hence the current flow through the diode, starts to increase. If this increase is permitted to continue until the current through the diode exceeds a certain minimum value—typically designated $I_s$, the sustaining current—the diode will switch to its low impedance condition, remaining locked-up in the low impedance condition if the biasing circuit of the diode is capable of maintaining a current flow therethrough of a value of at least $I_s$ when the breakdown voltage is removed. In other words, to switch a pnpn diode from its high to its low impedance condition, the voltage applied thereacross must not only be of a magnitude greater than the breakdown voltage thereof but must also persist long enough to allow the current therethrough to build up to at least $I_s$. If the breakdown voltage is not maintained across the body of a pnpn diode for a time long enough for $I_s$ to be attained therein, the average minority carrier density in the intermediate zones thereof will, upon removal of the breakdown voltage, decay toward whatever value was characteristic of the zones prior to the application to the body of the breakdown voltage.

Furthermore, if the breakdown voltage is maintained across the body of a pnpn diode for a time long enough for $I_s$ to be attained therein but the biasing circuit of the diode is incapable of maintaining a current value of at least $I_s$ therethrough when the breakdown voltage is removed therefrom, the average minority carrier density in the intermediate zones thereof will, upon removal of the breakdown voltage, decay toward whatever value was characteristic of the zones prior to the application to the body of the breakdown voltage.

The rates of charge density build up and decay in a pnpn diode are a function of the recombination rates in the intermediate zones thereof. These rates may be exactly controlled by such techniques as irradiation and impurity addition, as is well known in the art.

Figure 2B:
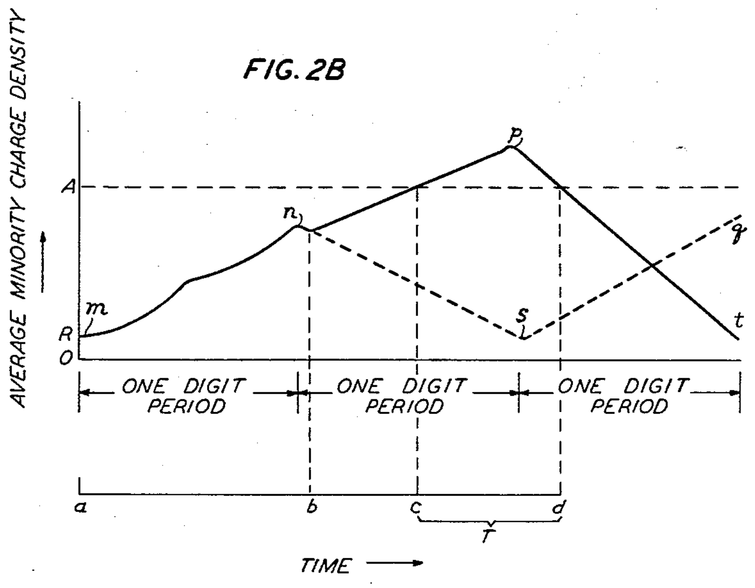
FIGS. 2B and 3 are graphical aids to the understanding of the operation of the diagrams of FIGS. 1 and 2A.

FIG. 2B depicts as a function of time the average minority charge density in the intermediate zones 251*a* and 251*b* of the diode 251 of FIG. 2A. FIG. 2B also represents the average minority charge density in the intermediate zones 252*a* and 252*b* of the diode 252 of FIG. 2A. Assume that at, and just prior to, a first instant of time, designated *a* on the time scale of FIG. 2B, no one of the first and second clock signals and test signals is applied to the pulse position detector 25. In that case, the bias source 257 causes a small reverse current flow through the diodes 251 and 252, which current corresponds to the charge density marked R on the vertical scale of FIG. 2B. Assume, then, that during the first digit period on the time scale of FIG. 2B, there is applied to the diodes a pulse of an amplitude sufficient to break down the devices 251 and 252 but of a duration not sufficient to allow attainment therein of the sustaining current. (The density A on the vertical scale of FIG. 2B corresponds to the sustaining current.) The resulting increase in charge density in the intermediate zones of the diode device is indicated by that portion of FIG. 2B which interconnects points *m* and *n*. Note that the density corresponding to point *n* falls short of the density level marked A, which also represents the density which must be established in the diodes 251 and 252 to cause actuating signals to be coupled to the windings 36 and 37 of the adjustable delay ciruit 30.

If, at the time marked *b* in FIG. 2B, another breakdown pulse is not coupled to the diodes 251 and 252, the charge densities therein proceed to decay along a path approximated by the curved portion designated *ns*. If, however, at time *b* another breakdown pulse is coupled to the diodes, the charge densities therein will further increase, as depicted by the curved portion *np*, to cause actuating signals to be coupled to the adjustable delay circuit 30. If another breakdown pulse is not coupled to the diodes 30 in an immediately adjacent digit position but is so coupled thereto after an interval of one digit position, the charge density decays during the pulseless interval, in the manner shown by the curved portion *ns*, and, then, during the application to the diodes of a second nonadjacent pulse, rises along the curved portion *sq* to a less-than-actuating level of charge density.

Following receipt by the diodes 251 and 252 of breakdown pulses in two adjacent digit positions and the response of the diodes to such adjacent pulses by providing actuating signals to the windings 36 and 37, the nonreceipt by the diodes of pulses in a next or third digit position causes the charge density therein to decay in the manner shown by the curved portion *pt* of FIG. 2B, so that a breakdown pulse in a fourth digit position (not shown in FIG. 2B) will not result in raising the charge density to the actuating level A. Advantageously, the diodes and their associated bias circuit elements are selected so that the diodes do not lock-up in response to the application of adjacent breakdown pulses thereto. More specifically, the biasing source 257 and the resistors 253, 254, 255, and 256 are selected so as to be incapable, upon removal of the breakdown pulses, of maintaining a current value of at least $I_s$ in either of the diodes 251 and 252.

Alternatively, however, the pnpn diode circuit described herein may be arranged to lock-up, that is, remain in the low impedance condition, in response to the application thereto of adjacent breakdown pulses, thereby continuously energizing an alarm (not shown) to indicate an out-of-synchronism condition. Such lock-up operation may be provided by selecting the biasing source 257 and the resistors 253, 254, 255, and 256 such that a current value of at least $I_s$ will be maintained through the diodes following the removal therefrom of adjacent breakdown pulses.

To summarize, each of the diodes 251 and 252 provides an actuating signal output therefrom if breakdown pulses are coupled thereto in immediately adjacent digit positions. Otherwise, the output signals therefrom are not capable of actuating the switch assembly 35 of the adjustable delay circuit 30.

Illustratively, as specified in detail herein, the windings 36 and 37, and the movable arm 35*a* associated therewith, are selected so that the arm 35*a* only responds to the application to the windings of the adjustable delay circuit 30 of an actuating signal whose duration is approximated by the time interval designated T on the time scale of FIG. 2B. In turn, an actuating signal of duration T only results from the condition wherein test and clock signals fall out-of-synchronism with respect to each other by one full digit position. Alternatively, however, it is, of course, clear that the windings 36 and 37, and the arm 35*a*, may be arranged to respond to out-of-synchronism conditions of less or more than one full digit position. In such an alternative arrangement each of the delay units duration is equal to the out-of-synchronism interval to which the adjustable delay circuit 30 is responsive.

Figure 3:
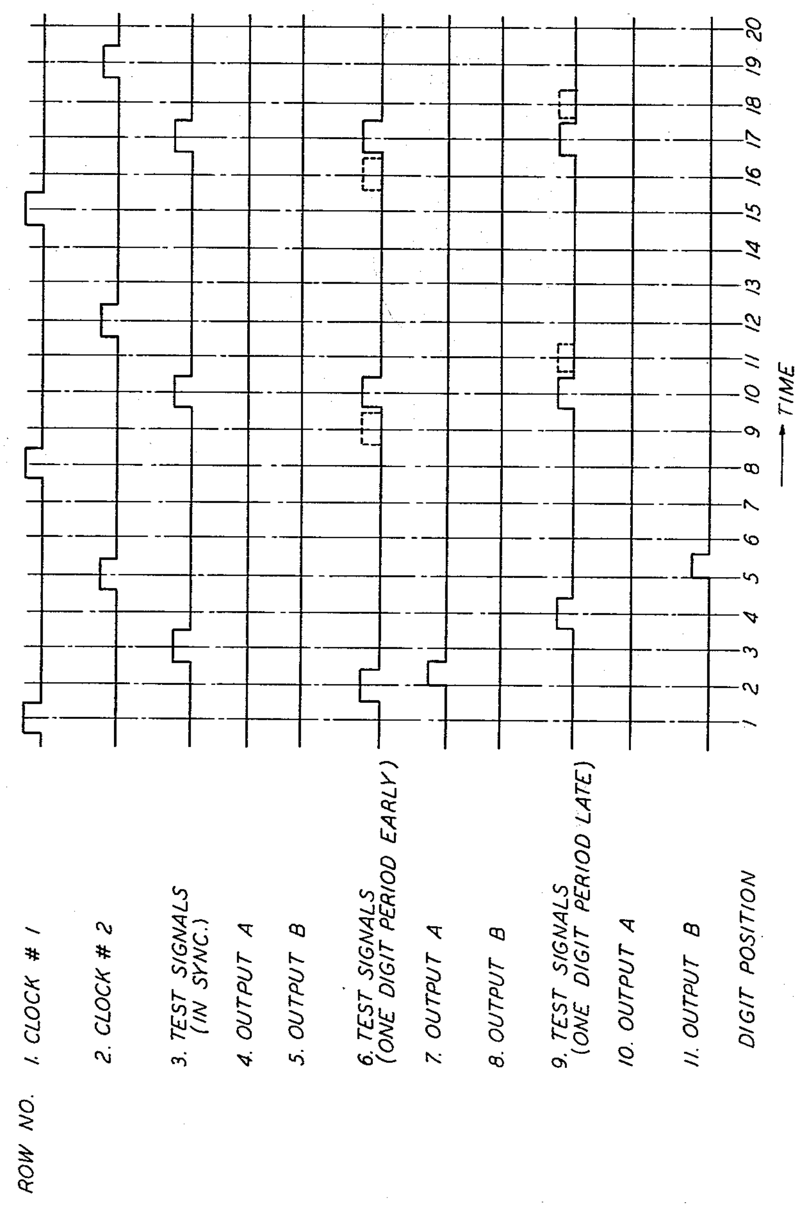

FIG. 3 illustratively depicts one of the many possible over-all patterns of test, and first and second clock signals, and the relative timing among them, that will cause the above-described digital information processing system to function as specified herein. The circuit 21 of FIG. 1 controls the operation of the first and second clock circuits 22 and 23 in a manner such that these clock circuits periodically couple to the pulse position detector 25, in a predetermined word period, signals of the type respectively shown in the first and second rows of FIG. 3. (At all other times the outputs of the clock circuits 22 and 23 are zero.) During this same predetermined word period, there are coupled to the detector 25 on the lead 26 test signals of the form shown in the third row of FIG. 3.

If the first and second clock signals arrive at the pulse position detector 25 in synchronism with the test signals, that is, in exact accordance with a predetermined time relationship, neither the diode 251 nor the diode 252 has pulses coupled thereto in immediately adjacent digit periods, as is clearly seen from noting the relative positions of the pulses in the top three rows of FIG. 3. Accordingly, as specified above, the diodes will not under such normal conditions supply an actuating signal to the adjustable delay circuit 30, as represented by the absence of output pulses in the fourth and fifth rows of FIG. 3. The path along which digital information signals are propagated will, therefore, normally include the delay units 31 and 32.

Now, assume that the test signals fall out of synchronism with the first and second clock signals and, specifically, that the test signals are advanced one digit position with respect to the clock signals. The first one of these out-of-synchronism test signals is shown in the second digit position in the sixth row of FIG. 3 and is observed to occur in a digit position immediately following the first one of the first clock signals. Accordingly, the diode 252, to which both first clock and test signals are coupled, will provide an output signal A, as indicated in row seven of FIG. 3. In turn, the energization of the winding 36 by the signal A causes the arm 35*a* of the switch assembly 35 to move one step in a clockwise direction, thereby adding the delay unit 33 to the path along which digital signals are propagated. As a result, the next test signal will occur in its proper predetermined time slot in digit position 10 rather than in digit position 9. Note that the dashed lines in the sixth row indicate the positions in which the early test signals would occur if a corrective signal were not applied to the winding 36.

Similarly, if following a period of normal transmission, that is, a period in which the first and second clock signals arrive at the pulse position detector 25 in accordance with a predetermined time relationship with the test signals, the test signals are delayed by one digit position, it is seen from the ninth row of FIG. 3 that the first pulse of the test word occurs preceding and immediately adjacent to the first one of the pulse outputs of the second clock circuit 23, thereby causing the diode 251 to provide an output signal B, as represented in the eleventh row of FIG. 3. The signal B energizes the winding 37 and causes the arm 35*a* of the switch assembly 35 to move one step in a counterclockwise direction, thereby removing one digit period of delay from the path traversed by digital signals and re-establishing the desired time relationship between the test and clock signals, as evidenced by the occurrence of test signals in row nine in digit positions 10 and 17 rather than, as indicated in dashed lines, in positions 11 and 18.

Advantageously, the switch assembly 35 may be of a type which responds to the application of an output pulse thereto by advancing one tap position. Thus, for example, if an out-of-synchronism condition of one type should be detected and corrected by advancing the arm 35*a* one step in a clockwise direction, a further deviation of the same type between the test and clock signals would result in another output signal from the pulse position detector 25 and in the switch assembly 35 being actuated to cause the arm 35*a* to move one more step in the clockwise direction. The assembly 35 may, of course, be arranged to include as many taps and corresponding delay units as may be considered necessary to compensate for the maximum expected deviation in the specified time relationship.

The implementations of the digital source 11, the master clock circuit 12, the control circuit 21, the clock circuits 22 and 23, and the inhibit circuit 26 are considered, in view of the end requirements therefor set forth above, to be clearly within the skill of the art and are, accordingly, not set forth in detail herein.

It is to be understood that the above-described arrangements are only illustrative of the application of the principles of the present invention. Numerous other arrangements may be devised by those skilled in the art without departing from the spirit and scope of the invention. Thus, for example, although the adjustable delay circuit 30 has been described as including a plurality of individual delay units, it is, of course, clear that other similar arrangements such as, for example, a unitary tapped delay line might be substituted therefor. Additionally, the illustrative switch-actuating relay assembly described herein may in some applications be advantageously replaced by suitable known gating circuits.

What is claimed is:

1. In combination in a digital information processing system, master clock circuit means, digital test signal source means responsive to the output of said master clock circuit means for supplying test signals during a predetermined word period, output circuit means, communication channel means including adjustable delay means interconnecting said source means and said output circuit means, pulse position detector means including two pnpn diode devices, means responsive to the output of said master clock circuit means and connected to said detector means for respectively applying to the diode devices of said detector means two sets of timing signals during said predetermined word period, means interconnecting said master clock circuit means and said output circuit means, means connected between the output of said adjustable delay means and an input of said detector for coupling digital test signals to each of the diode devices of said detector during said predetermined word period, and means interconnecting the output of said detector and said adjustable delay means for coupling to said delay means signals from the detector representative of the time relationship between said timing and said test signals, said adjustable delay means including means responsive to the signals from said detector for selectively controlling the number of digit periods of delay included in said delay means.

2. A combination as in claim 1 wherein said adjustable delay means includes switching means responsive to said signals from said detector for selectively adjusting the delay of said adjustable delay means.

3. A combination as in claim 1 wherein said adjustable delay means includes a plurality of single digit period delay units and switching means responsive to said signals from said detector for connecting selected ones of said delay units in series in said communication channel means.

4. In combination in a digital information processing system, a communication channel, first means for supplying master clock signals, an output circuit coupled to one end of said channel and responsive to the signals from said first means, second means responsive to the signals from said first means and coupled to the other end of said channel for supplying digital test signals and variable information signals to said channel in respectively different test and variable information word periods, a pulse position detector including two pnpn diode devices, third means responsive to the signals from said first means and coupled to said detector for respectively supplying two sets of timing signals to the diode devices of said detector, fourth means interconnecting the output circuit end of said channel and said detector for coupling only said digital test signals to each of the diode devices of said detector, and adjustable delay means responsive to the output of said detector and connected in said channel between said second means and the point of interconnection between said channel and said fourth means for selectively controlling the number of digit periods of delay included in said channel.

5. A combination as in claim 4 wherein said fourth means includes inhibiting circuit means responsive to an output of said third means for coupling only said digital test signals to each of the diode devices of said detector.

References Cited in the file of this patent

UNITED STATES PATENTS

| | | |
|---|---|---|
| 3,008,087 | Darwin | Nov. 7, 1961 |
| 3,047,841 | Kondi | July 31, 1962 |